United States Patent [19]
Roman et al.

[11] Patent Number: 5,117,551
[45] Date of Patent: Jun. 2, 1992

[54] TOOL-CARRIER VEHICLE FOR INSPECTING AND/OR MAINTAINING BOLT HOLES IN THE COVER OF A STEAM VESSEL OR THE LIKE

[75] Inventors: Christian E. Roman, Pierrevert; Michel H. Bernardin, Volx, both of France

[73] Assignee: Barras-Provence, Manosque, France

[21] Appl. No.: 454,921

[22] Filed: Dec. 22, 1989

[30] Foreign Application Priority Data

Jan. 10, 1989 [FR] France .................. 89 00344

[51] Int. Cl.⁵ .......................... B23C 3/02; B25B 29/02
[52] U.S. Cl. .................................. 29/560; 51/241 S; 81/57.38; 408/77; 409/179
[58] Field of Search ............ 409/178, 179, 180; 408/77, 78; 81/57.38; 51/241 S; 29/26 B, 560

[56] References Cited

U.S. PATENT DOCUMENTS

| | | | |
|---|---|---|---|
| 3,563,116 | 2/1971 | Gurvich et al. | 409/178 X |
| 3,617,142 | 11/1971 | De Wane et al. | 51/241 S X |
| 4,177,610 | 12/1979 | Farkas et al. | 51/241 S |
| 4,233,727 | 11/1980 | Kautetzky et al. | 81/57.38 X |
| 4,552,038 | 11/1985 | Heiermann et al. | 81/57.38 |

FOREIGN PATENT DOCUMENTS

| | | |
|---|---|---|
| 0050561 | 4/1982 | European Pat. Off. . |
| 3613170 | 10/1986 | Fed. Rep. of Germany . |
| 8101079 | 10/1982 | Netherlands . |
| 0841956 | 6/1981 | U.S.S.R. .................. 81/57.38 |

Primary Examiner—Z. R. Bilinsky
Attorney, Agent, or Firm—Dvorak and Traub

[57] ABSTRACT

The present invention relates to a tool-carrying vehicle for transporting a tool and positioning it over bolt holes in a flange of a vessel, and for moving the tool in translation and/or rotation, the vehicle comprises:

- a tool-carrying elevator column extending upwards perpendicularly from the vehicle chassis;
- a tool-passing opening formed through the chassis adjacent to the column and situated in line with the position occupied by a tool fixed to an elevator in the column so as to allow a tool to be passed down through the chassis and inserted into a bolt hole, and to allow it to be raised to its initial position after acting in the hole; and
- guide wheels and position adjustment templates for guiding and adjusting the position of the chassis on a flange so that a tool lies exactly on the axis of a bolt hole, regardless of the hole diameter.

Such a vehicle is particularly suitable for inspecting and maintaining the vessels of steam generators.

21 Claims, 8 Drawing Sheets

Fig. 11

TOOL-CARRIER VEHICLE FOR INSPECTING AND/OR MAINTAINING BOLT HOLES IN THE COVER OF A STEAM VESSEL OR THE LIKE

DESCRIPTION

The present invention relates to a tool-carrier vehicle for inspecting and/or maintaining bolt holes in the support flange for the cover of a steam vessel or the like.

BACKGROUND OF THE INVENTION

The technical field of the invention relates to robots for inspecting, maintaining, or reconditioning metal structures including cylindrical cavities having tapped inside surfaces.

The covers of devices such as steam generator vessels are assembled to the bodies of said vessels by means of nuts screwed onto bolts which are in turn screwed into tapped holes regularly distributed around a cover support flange which is welded to the top of the vessel body.

The Assignee has already implemented unit portable machine tools specially adapted to performing specific tasks in relation to such work, and one such machine is described in French patent application number 88/15188.

The object of the present invention is to provide a modular apparatus capable of receiving tools specially designed for performing specific tasks that need to be performed in bolt holes distributed around the flange of a vessel, for example the vessel of a steam generator, with tool modules for inspection, for greasing, for brushing, for polishing, for milling, etc., being placed on a vehicle module, and with some of the tool modules having a tool rotary drive module interposed between themselves and the vehicle module.

SUMMARY OF THE INVENTION

This object is achieved by a tool carrier vehicle for transporting and positioning said tool over bolt holes in the flange of a vessel and for moving said tool in rotation and/or translation, such a vehicle comprising a chassis fitted with wheels for moving over the top face of the flange, motor means for rotating at least one of said wheels and causing the vehicle to move over the flange, and means for stopping the vehicle so that the tool can be presented successively on the axis of each of the bolt holes in the flange, said vehicle further comprises:

- a tool-carrying elevator column extending perpendicularly upwards from the chassis;
- a tool-passing opening formed adjacent to said column and situated in alignment with a tool-receiving position on elevator means of the column for displacing the tool down through said chassis, inserting it in a bolt hole, and returning it to its initial high position after acting in a hole; and
- guide means and position adjusting means for guiding and adjusting the position of the chassis on the flange in order to place the tool exactly on the axis of a bolt hole as a function of the diameter thereof.

In one embodiment, the guide means for guiding the chassis on the flange comprise firstly at least two "reference" wheels mounted to rotate about axes parallel to the elevator column and disposed in front of and behind said opening on one of the sides of the chassis, with the reference wheels being situated beneath the chassis in a plane perpendicular to said column and bearing against one of the sides of said flange, and secondly at least two "presser" wheels situated on the opposite side of the chassis to the side on which the said reference wheels are disposed, said presser wheels being situated in front of and behind said opening and beneath the chassis, and being mounted to rock about axes perpendicular to the axes of rotation of said reference wheels, said presser wheels being acted upon by means for moving them towards and away from the chassis, and being forced against the other side of the flange of the vessel when in a vehicle-guiding position.

In order to position the vehicle longitudinally on the flange relative to the bolt holes, said vehicle includes a detection arm in said tool-passing opening, said arm being mounted to swing in a plane perpendicular to the axis of the elevator column and being situated at the bottom of the chassis to swing about an axis situated between an end-of-stroke abutment fixed to one of the ends of the arm and a point at which an arm-driving member is coupled thereto for putting said arm either in an extended position inside the opening and in abutment against the chassis, or else in a retracted position adjacent to one of the sides of the chassis in order to leave room to pass the tool, the end of the arm opposite to its end having said abutment including at least two proximity detectors serving to detect the peripheral edge of a bolt hole in order to position the vehicle and the tool over the hole during vehicle displacement over the flange.

In order to position the vehicle transversely to move the tool level with the bolt hole, said vehicle also includes a second arm in said tool-passing opening, said second arm being hinged to the chassis adjacent to its side opposite to the side to which the detection arm is hinged, said second arm swinging in a plane parallel to that of said detection arm to enable the second arm to be put either in an extended position where it extends into the opening or to retract said arm against the chassis in order to allow a tool to pass, the free end of said second arm including a gauge having at least two reference marks for matching with the peripheral edge of a bolt hole in order to enable the vehicle to be properly positioned transversely on the flange of the vessel for a tool to be positioned on the axis of the bolt hole.

The elevator column is removable and is received in its own housing in the chassis adjacent to said tool-passing opening, the inside of said elevator column containing a threaded shaft extending along the height of the column and mounted between two sets of bearings, said shaft being connected to a motor and stepdown gear unit to be rotated thereby, and co-operating with a tapped portion of said elevator means displaceably mounted in a slot running along the height of one of the side walls of the column, said elevator means comprising a carriage which is guided by a slideway running parallel to said shaft and co-operating with ball skids, the bottom of said column including positioning studs which co-operate with stud-receiving housings in the chassis and with locking means for clamping it to the chassis.

The carriage of the elevator column includes a head plate which is orientable about an axis perpendicular to said column and extending above and to one side of the tool-passing opening in the chassis, said head plate including tool-fixing means, and said carriage also includes locking means for locking said head plate in position after its orientation has been adjusted.

When the tool is "fixed" and is displaced in translation in order to be inserted into the bolt hole and be withdrawn therefrom at the end of its operation, the head plate of the carriage and the tool include complementary male/female dovetail fixing means whose right cross-section increases going downwards.

When the tool is rotary, it is mounted in a removeable rotary drive device connected to said head plate of the carriage, and said head plate and the said drive device include complementary male/female dovetail fixing means whose section increases going downwards. In this embodiment, said drive device comprises a frame including said dovetail fixing means, said frame being cantilevered over said tool-passing opening in the chassis and including a rotary tool-carrying drive ring whose axis of rotation is parallel to the elevator column.

Said drive ring includes a central opening for receiving the tool and further includes a portion extending outside and beneath the frame, said portion having an external thread for co-operating with the internal tapping of a locking ring which actuates locking means for fixing the tool to the drive ring. The drive ring also includes a peg substantially halfway up the drive ring for positioning a tool in the ring and for preventing any relative rotation between the tool and the ring, said peg co-operating with a groove in the tool running parallel to the generator lines of the head of the tool.

The result of the invention is a modular machine tool capable of receiving tool modules in succession for performing inspection, maintenance, or reconditioning tasks in bolt holes distributed, for example, around the cover-supporting flange of a steam generator vessel, or of any other similar device.

In addition to its high accuracy in approaching the holes which is made possible by the detection means fitted to the vehicle, thereby placing the tools exactly on the axes of the holes, the advantages of apparatus of this design include ease of maintenance due to the modular structure of the machine tool.

BRIEF DESCRIPTION OF THE DRAWINGS

An embodiment of the invention is described by way of example with reference to the accompanying drawings, in which.

DETAILED DESCRIPTION

Figure 1:
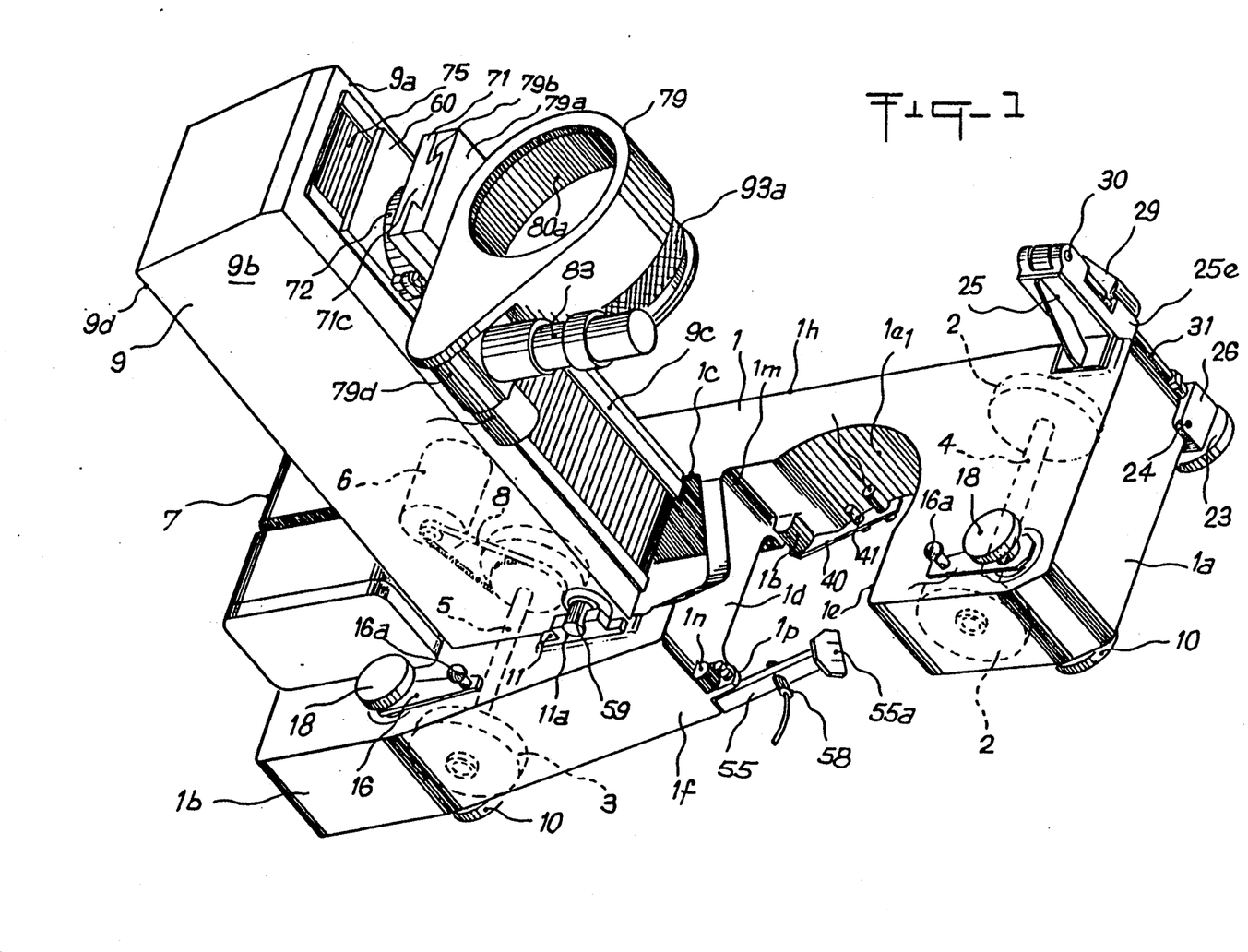
FIG. 1 is a perspective view of a tool carrier vehicle of the invention, shown without a tool.

Reference is made initially to FIG. 1 of the drawings which shows a tool carrier vehicle of the invention, the vehicle comprising a chassis 1 e.g. made of cast aluminum alloy, and generally trapezoidal in shape, being narrower at its front end 1a than at its back end. In order to move along the flange of the vessel, the chassis has pairs of elastomer-tired wheels 2 and 3. The front wheels 2 are mounted to rotate freely on an axle 4 which is fixed to the chassis, while the back wheels 3 are fixed on an axle 5 which is supported by the chassis and rotated via a motor and stepdown unit 6 placed in a housing 7 and driving the axle via a transmission 8 comprising a cog belt and a pulley wheel. The chassis constitutes the base module of the apparatus and includes a rectangular housing 1c for receiving a tool-carrying elevator column extending perpendicularly upwards from the chassis 1 and described in greater detail below. The housing 1c is formed in the central portion of the chassis while being somewhat offset towards the back, and it is delimited to the front by a partition 1d common to said housing 1c and to a large opening 1e which is generally square in shape and which opens out to one of the sides 1f of the chassis. The opening 1e is offset towards the front, and in its front corner furthest from said side 1f, it includes a circular wall $1e_1$, such that the tool 99 (not shown in FIG. 1) displaced by said elevator column can pass through the chassis 1 and be inserted in a bolt hole.

Figure 2:
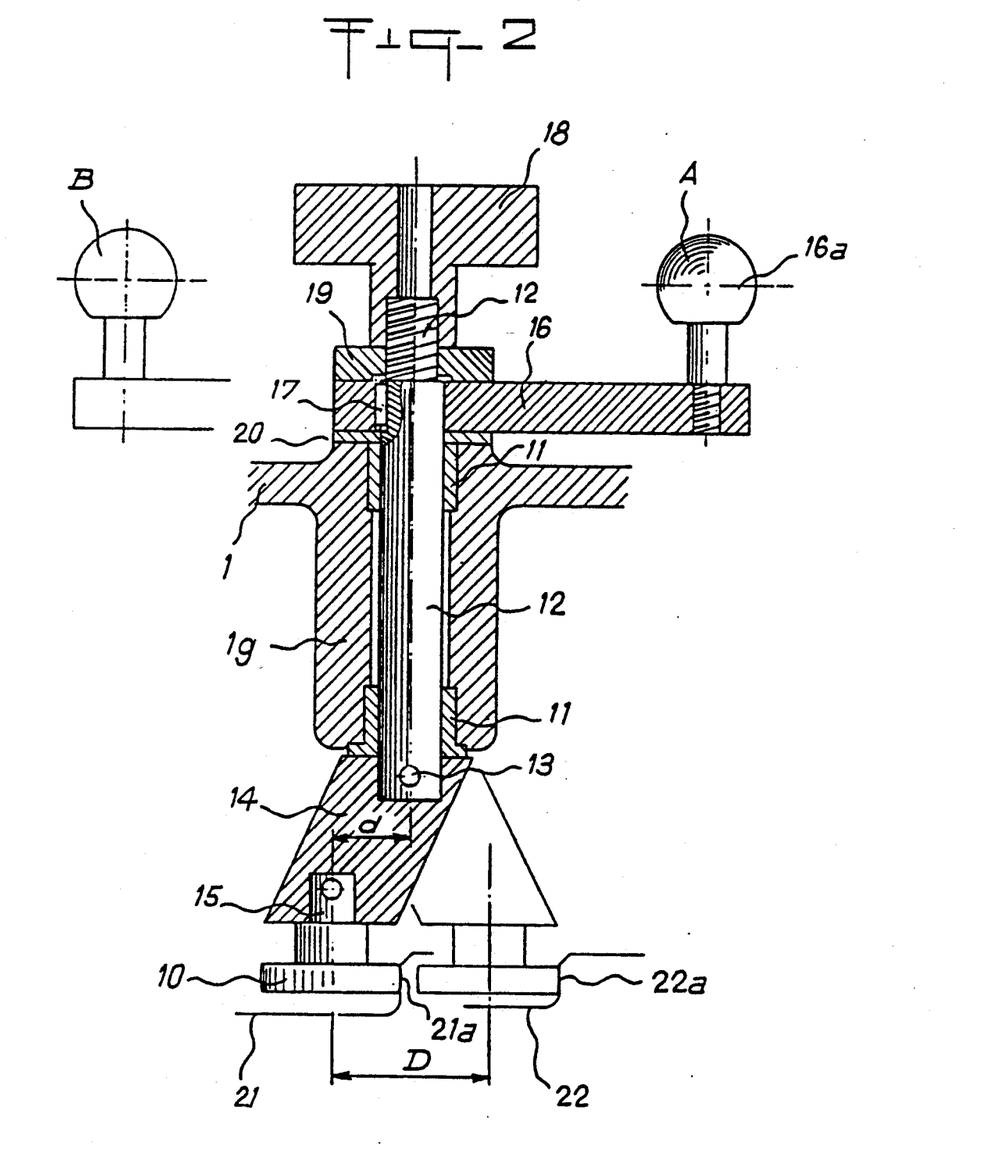
FIG. 2 is a section view through the means for moving the reference wheels.

Adjacent to its side 1f and its front and back corners on either side of the opening 1e, the chassis has two "reference" wheels 10 situated beneath the chassis 1 and lying in a plane perpendicular to the column 9, said wheels being mounted by means of respective bushes 1g. The way each of these wheels 10 is mounted is shown in FIG. 2. The bush 1g constitutes a bearing fitted with self lubricating rings 11 supporting a shaft 12. The bottom end of the shaft 12 is fixed by means of a pin 13 to a support 14 whose outline is in the shape of a parallelogram, with the wheel 10 being mounted at the bottom end of the support. The wheel is mounted free to rotate about a shaft 15 running parallel to the shaft 12 and excentric relative thereto. The top portion of the shaft 12 which projects above the chassis 1 includes an operating member such as a handle 16 which is secured to the shaft by a key 17 and which includes a grasping member 16a for moving the handle. Above the key 17, the shaft 12 includes a threaded portion 12a having a locking member in the form of a knurled knob 18 screwed thereon. The knob bears against the handle 16 via a pressure washer 19. Another washer 20 is interposed between the handle 16 and the chassis 1. As can be seen in FIG. 2, the reference wheel 10 is mounted so as to be capable of taking up two different positions by being moved by the lever 16 by rotation through 180° between positions A and B. For example and as shown in the drawings the excentric offset d of the shaft 15 relative to the shaft 12 represents one half of the displacement D of the wheel for positioning the vehicle on two flanges 21 and 22 of different widths, and for placing the tool on the axis of a bolt hole. The reference wheel 10 bears against the inside edge 21a or 22a of the flange of the vessel.

It is possible to guide the vehicle on the flange of the vessel and to position it thereon by means of two presser wheels 23, for example, which wheels are complementary to the reference wheels 10 and are mounted to rock about respective shafts 24 extending perpendicularly to the shafts 15 of the reference wheels. The presser wheels 23 are situated on the side 1h opposite to the side 1f on which the reference wheels 10 are mounted, and they are disposed, for example, level with said reference wheels and beneath the chassis 1.

Figure 3:
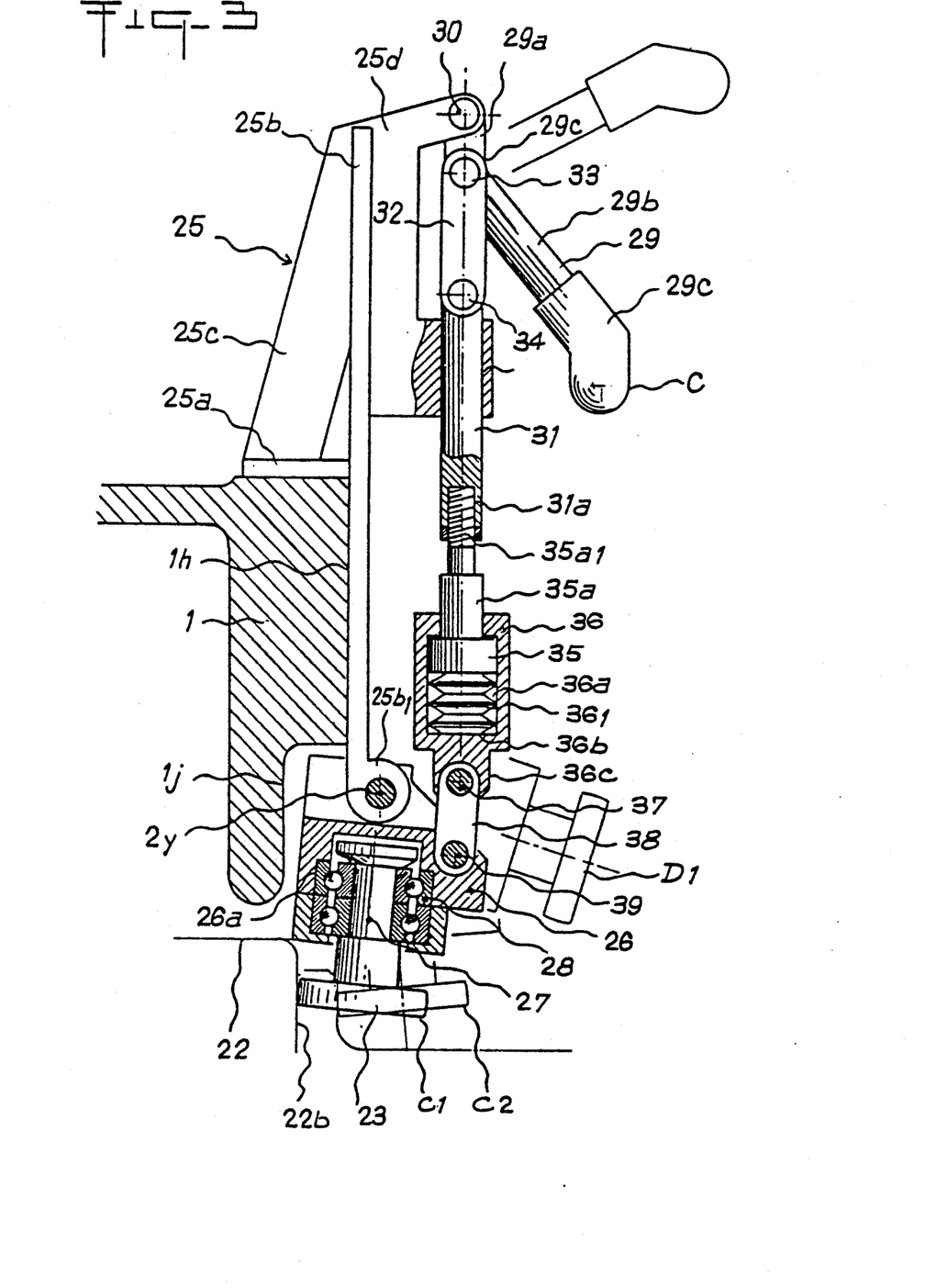
FIG. 3 is a section view through the means for moving the presser wheels.

The way each of the presser wheels 23 is mounted is shown in accompanying FIG. 3. The top portion of the chassis 1 includes a support 25 e.g. bolted in place, and extending outside the chassis. This support includes a bearing plate 25a fixed perpendicularly to a cheek 25b with the connection between the plate and the cheek being reinforced by a web 25c. The cheek 25b is pressed against the side 1h of the chassis and its bottom end includes a cylindrical swelling 25b₁ with an axial bore for receiving the shaft 24 about which the presser wheel 23 rocks. The wheel 23 is mounted to rotate freely in a bearing 26a received in a rocking support 26 partially disposed in a recess 1j formed in the chassis 1. The presser wheel 23 is fixed to a shaft 27 mounted in a set of two superposed ball bearings 28 constituting the bearing 26a. The support 26 is connected to an operating lever 29 which includes a bend dividing it into a short portion 29a and a longer portion 29b. Its end has an operating handle 29c. The lever 29 pivots in a plane perpendicular to the rocking shaft 24 of the support 26 about its own pin 30 mounted in a fork 25d on the support 25.

The support 25 also includes a cylindrical slideway 25e in which a cylindrical slider 31 is slidably received. The slider 31 is connected to the lever 29 by two links 32 situated on either side of the lever 29 and of the slide 31. The links are hinged firstly about a pin 33 mounted through the bend 29c in the lever, and secondly about a pin 34 mounted at the top end of the slide 31. The bottom end of the slide has a tapped hole 31a for receiving the threaded portion 35a₁ of the rod 35a of a piston 35 mounted in a cylinder 36 and engaging spring means 36₁, e.g. Belleville type spring washers occupying the space 36a that exists between the piston 35 and the bottom 36b of said cylinder 36. The bottom of the cylinder has a transversely pierced tab 36c for receiving a hinge pin 37 common to two links 38 disposed on either side of said tab, each having one of their ends hinged to said pin 37 and having their opposite ends hinged to a pin 39 mounted on the rocking support 26 at a position which is offset relative to the rocking shaft 24 of the support, thereby enabling said support to be rocked by operating the lever 29. All of the above-described pins in the presser wheel mechanism are parallel to its rocking shaft 24.

The presser wheel 23 is caused to bear against the outside edge 22b of the flange 22 of the vessel.

The figure shows the various different positions of the presser wheel 23 as a function of the width of the flange 22. Positions C₁ and C₂ are obtained when the lever 29 is lowered to position C. The various different positions of the wheel 23 are compensated by said spring means 36₁. The position D₁ of the wheel 23 is obtained when the lever 29 is raised to position D.

At the bottom of its tool-passing opening 1e, the chassis 1 includes an arm 40 mounted to pivot in a plane perpendicular to the elevator column about a pivot pin situated adjacent to the side 1h of the chassis on which the presser wheels 23 are mounted, with the pivot pin being received in a thickening 1l of the chassis that projects into the opening 1e and which is situated close to the angle 1m formed in said opening with the wall 1d.

The free end of the arm 40 has two detectors 41 and 42. In its non-detection position, it is folded against the said side 1h of the chassis 1. In its detection position, it is swung out and held in place in the middle of the opening 1e.

Figure 4:
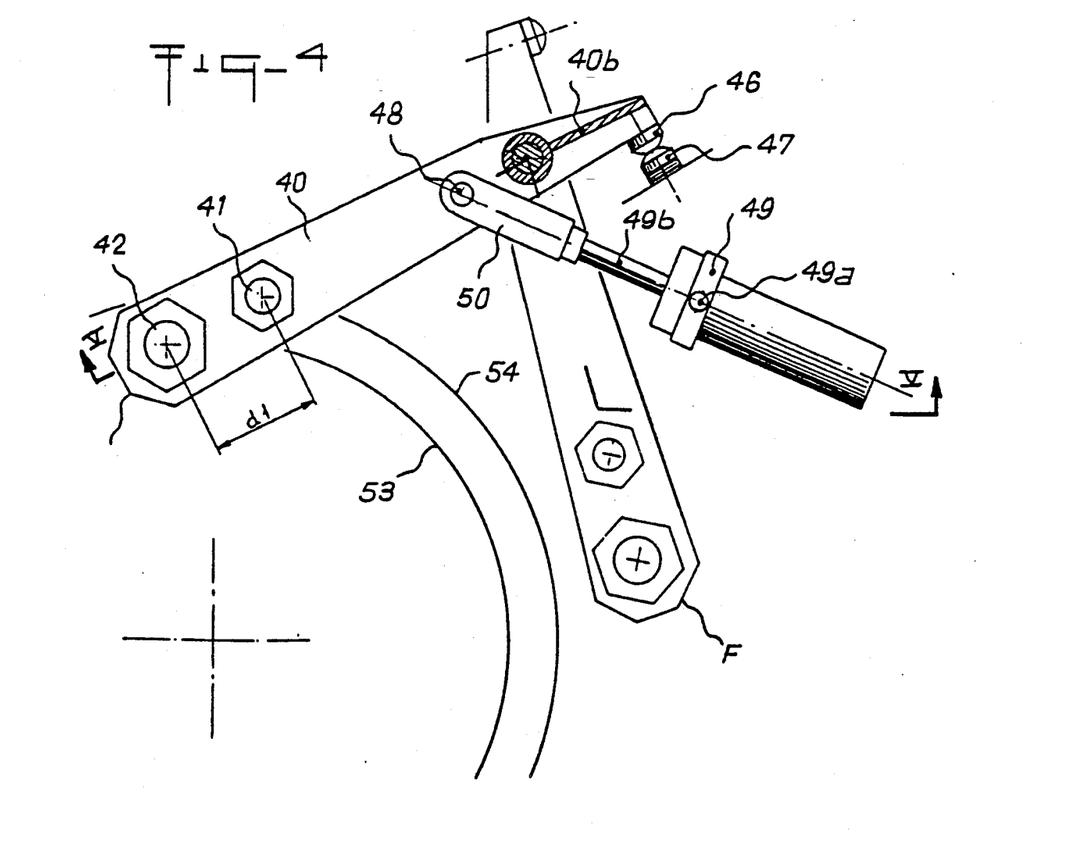
FIG. 4 is a plan view of the detection means fitted to the vehicle for detecting holes as it moves along the flange and for locking the vehicle successively on the axis of each bolt hole.
Figure 5:
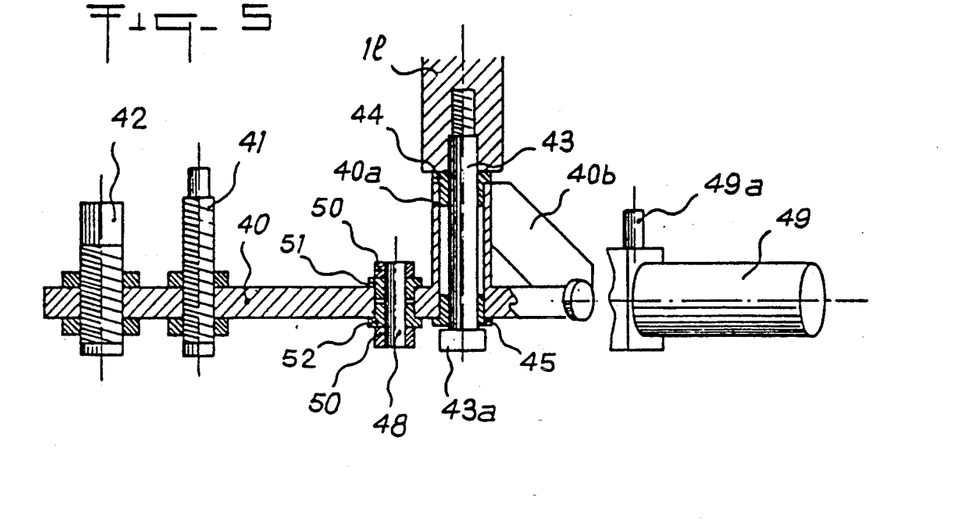
FIG. 5 is a section view of the FIG. 4 detection means on line V—V.

The arm 40 and its components are shown in FIGS. 4 and 5. The arm 40 is hinged about a pin 43 which is screwed into the thickening 1l of the chassis 1. The arm 40 includes a sleeve 40a through which the pin 43 passes, with the sleeve holding two self lubricating 44 and 45. The arm is held in the vertical direction by the head 43a on the pin 43. The sleeve 40a is held in position by a web 40b welded both to the sleeve and to the arm.

The sleeve 40a and its hinge pin 43 are situated close to one of the ends of the arms 40, between an end-of-stroke abutment 46 fixed to said end for coming into contact with an abutment point 47 fixed to the chassis 1, and a hinge pin 48 at the end of an actuator 49 (e.g. a pneumatic actuator) which is in turn hinged at 49a to the chassis 1. The rod 49b of the actuator 49 has a fork 50 at its free end which is placed astride the arm 40 and which holds the pin 48 passing transversely through both the arm 40 and the fork 50. The pin 48 is received in two self lubricating rings 50 and 51 fixed to the arm 40. The end of the arm 40 opposite to its end having the abutment 46 carries the detector 42. The detector 41 is set back a little therefrom towards the sleeve 40a.

The distance $d_1$ between the two detectors is determined so that when the arm 40 is in its detection position E, the detectors coincide with the peripheral edges of bolt holes 53 and 54. This detection takes place while the vehicle is moving along the flange of the vessel, and the vehicle comes to rest in such a manner as to cause the tool to lie exactly on the axis of the bolt hole 53 or 54. As soon as the vehicle is in position and braked on the flange, the arm 40 is moved back to its retracted position F by the actuator 49, as shown in FIGS. 1 and 4.

Said tool-passing opening 1e of the chassis 1 also includes a second arm 55 which is manually operable and hinged at one of its ends to a thickening 1n situated adjacent to the side 1f of the chassis and in the vicinity of said side, the thickening containing a pin 56 parallel to the pin 43 of the above-described arm 40 in order to allow the second arm 55 to move in a plane parallel to said first arm 40. Beneath the arm 55 there is a lug 1p which, together with the thickening 1n, delimits a space in which the arm 55 can move.

The arm 55 includes a ball positioning device 57 whose ball co-operates with conical holes 1q and 1r formed on a portion of a circumference of radius R. The arm 55 can thus take up either one of two positions.

In its position G, the arm is retracted against the wall 1d of the opening through the chassis. This position is detected by a proximity detector 58 fixed on the arm 55. In its position H, the arm is in its working position.

Figure 6:
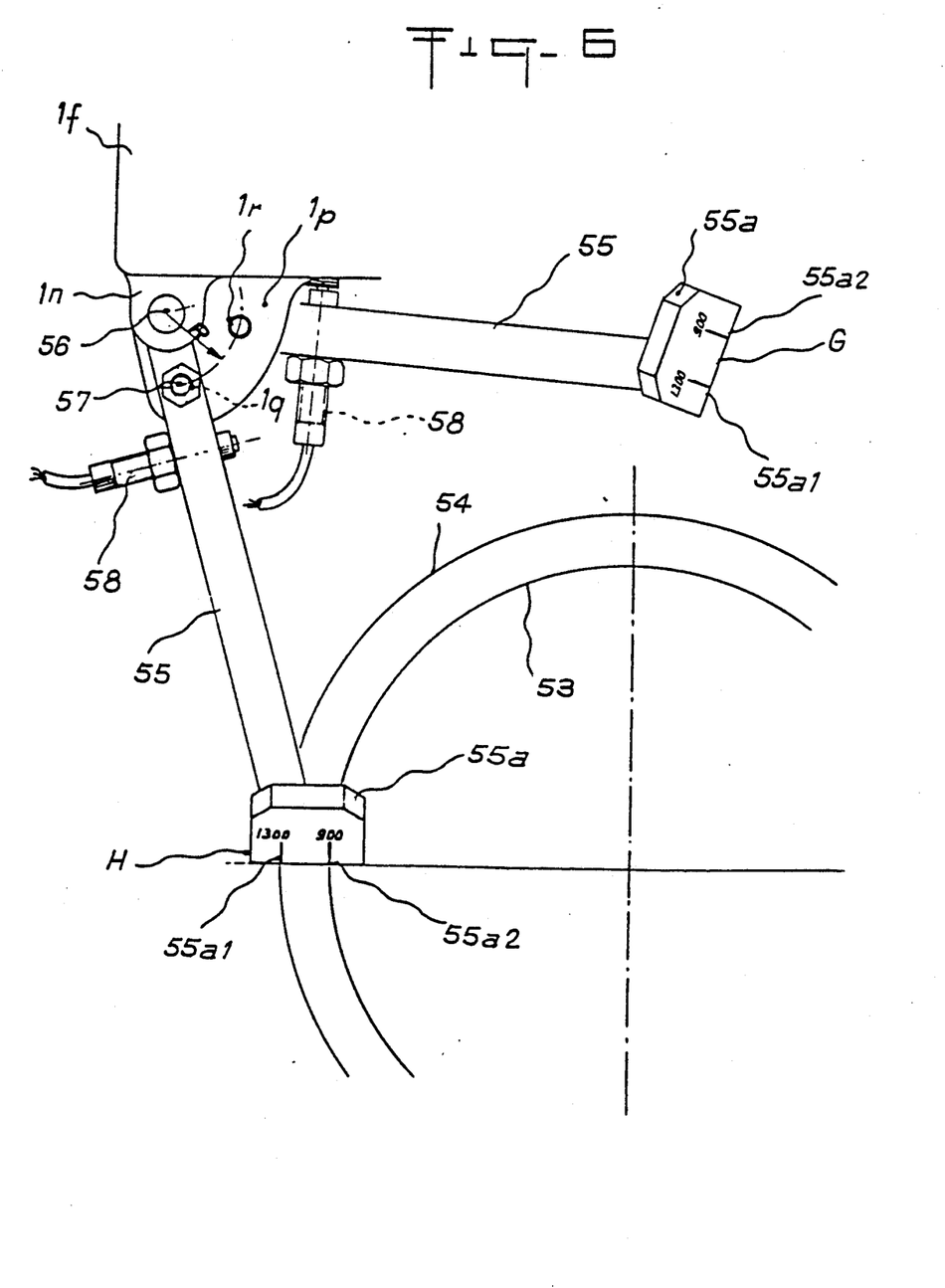
FIG. 6 is a plan view of the gauge for transversely positioning the vehicle on the flange.

The free end of the arm 55 includes a gauge constituted by a metal plate 55a extending in a plane perpendicular to the plane in which the arm moves. This plate 55a may be welded to the arm 55, for example, and it is oriented relative to the arm in such a manner that when extended in the working position, the plate 55a lies in a diametral plane of the bolt hole 53 or 54.

The outside face of the gauge 55a has two marks 55a₁ and 55a₂ which correspond to the peripheral edges of bolt holes.

The gauge 55a when extended in its working position H is used, when the vehicle is initially put into place on the flange of the vessel, to enable the operator to position said vehicle transversely relative to the flange in such a manner that the tool lies exactly on the axis of a bolt hole. When using the plate for positioning purposes, the operator acts on the reference wheel 10 by operating the handle 16 in order to put them into position against the edge 21a or 22a of the flange as a function of its width. The wheels 10 are then locked into place by the knurled knob 18 and the presser wheels 23 are put into contact with the outside edge 22b of the flange in order to guide the vehicle.

Figures 7, 9:
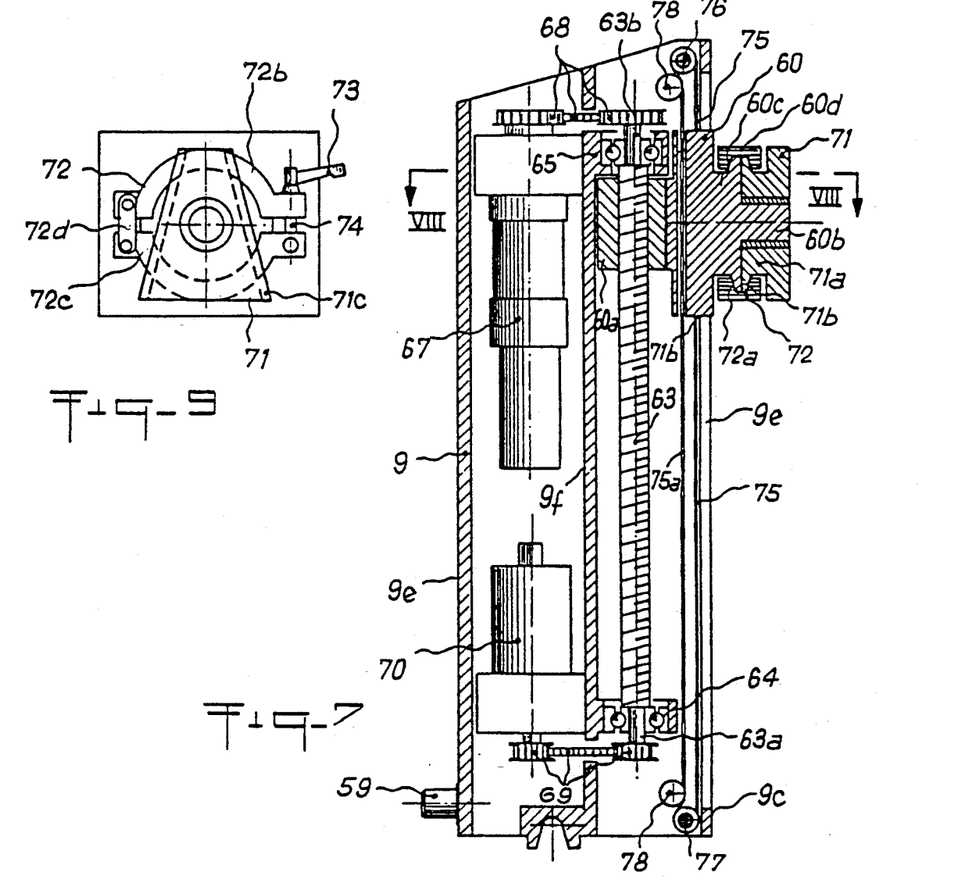
FIG. 7 is an axial section through the elevator column.
FIG. 9 is a view as seen looking along arrow F of FIG. 7.
Figure 8:
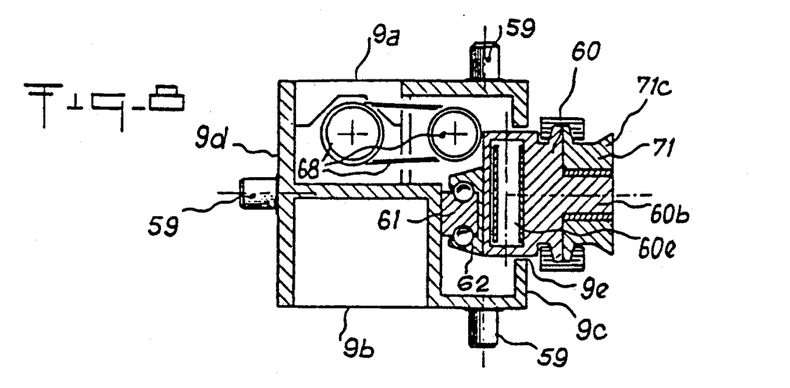
FIG. 8 is a section view on line VIII—VIII of FIG. 7.

Reference is now made to FIGS. 7 to 9 which show the disposition of the various means used in the elevator column module 9. This module has a uniform rectangular right cross-section up its entire height, and at its bottom end it has cylindrical positioning studs 59 which engage in cylindrical notches 1₁a formed in positioning parts 1₁ disposed around the housing 1c in the chassis, and fixed thereto by bolting, for example. The column 9 thus comprises one stud extending outwards from each of its two side walls 9a and 9b from positions relatively close to the front wall 9c, and one stud 59 fixed in the middle of its rear wall 9d. The column 9 is locked to the chassis by clamping jaws (not shown).

The front wall 9c of the elevator column 9 has a large rectangular opening or slot 9e extending over most of the height of said wall and moveably receiving a tool-carrying carriage 60 which is guided by a slideway 61 fixed to an inside wall of the column and which co-operates with ball sliders 62 fixed to the carriage 60. Inside the column 9, the carriage includes a tapped portion 60a which co-operates with a threaded shaft 63 mounted between two sets of ball bearings 64 and 65 which receive the two free ends 63a and 63b of said shaft 63. The bearings are fixed to the inside wall 9f which delimits two compartments inside the column, one of the compartments, 66, contains the threaded shaft 63 which raises and lowers the carriage 60. The shaft 63 is rotated by a motor and stepdown gear unit 67 and via a transmission comprising pulley wheels and a cog belt 68.

The end 63a of the shaft 63 acts via another pulley and cog belt transmission 69 on an absolute encoder 70 which provides the exact position of the carriage as a function of the number of rotations of the shaft 63, thereby specifying the position of the tool both when it is inside a bolt hole, and when it is outside. The threaded shaft 63 and the slideway 62 are parallel with each other and with the axis of the elevator column 9.

Outside the column, the carriage 60 has an orientable head plate 71 mounted to rotate on a stub shaft 60b fixed to the carriage and extending perpendicularly therefrom. The carriage 60 and the plate 71 have respective cylindrical extensions 60c and 71a facing each other, and each has a conically flared peripheral rim 60d or 71b at its end. The conical rims 60d and 71b are symmetrical and their generator lines intersect in the junction plane between the carriage and the plate. A collar 72 is disposed around the rims 60d and 71b of the carriage and the plate, with the collar 72 being in the form of a two hinged parts having a V-shaped groove 72a which co-operates with said conical rims 60d and 71b. The two half-collars 72b and 72c are hinged together by two links 72d. The collar is clamped to fix the position of the plate 71 relative to the carriage 60 by means of a tapped handle 73 co-operating with a threaded portion of a pin 74 hinged to the half-collar 72c and bearing against the other half-collar 72b when clamped.

The slot 9e in the column along which the carriage 60 moves is masked by a protective tape 75 having its ends 75a and 75b connected to the carriage 60, said tape being wound over two rolls, one of which 76 is situated at the top of the slot 9e and the other of which, 77, is situated at the bottom thereof. The tape 75 is kept under tension by two tensioning rolls 78.

The carriage 60 includes a duct 60e of rectangular right cross-section through which the return length 75a of the protective tape passes.

The purpose of the tape is to protect the members inside the column from dust, and in particular to protect the threaded shaft 63 and the slideways 61.

The head plate 71 has a dovetail 71c thereon whose cross-section increases going downwards. This dovetail constitutes one of the parts for fixing a tool or a drive module for rotating a tool, and is described in greater detail below.

When the tool is a "fixed" tool, i.e. is displaced in vertical translation in order to be inserted into a bolt hole and in order to be withdrawn therefrom after acting therein but without requiring it to rotate about its own axis, then the tool has a female dovetail whose section increases going downwards and constitutes the portion complementary to the carriage's tool-fixing means itself constituted by said male dovetail 71c.

The tool is presented in such a manner that the female portion of the dovetail assembly is moved over the male portion of the dovetail and it is fixed thereon by moving said assembly portions relative to each other until the tool is secured on the plate 71.

Figure 10:
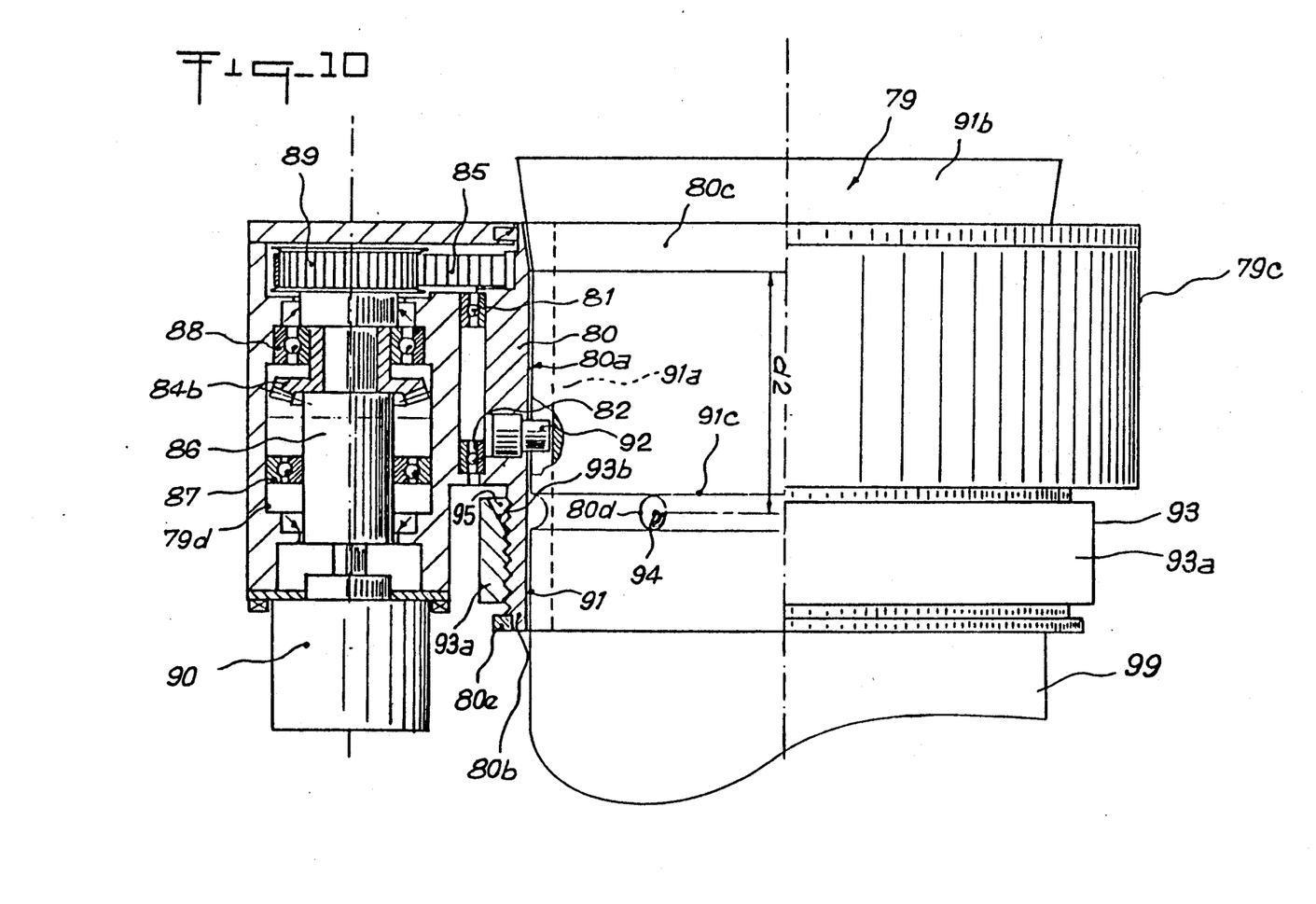
FIG. 10 is an elevation half view and a section half view through the rotary drive device for the tool.
Figure 11:
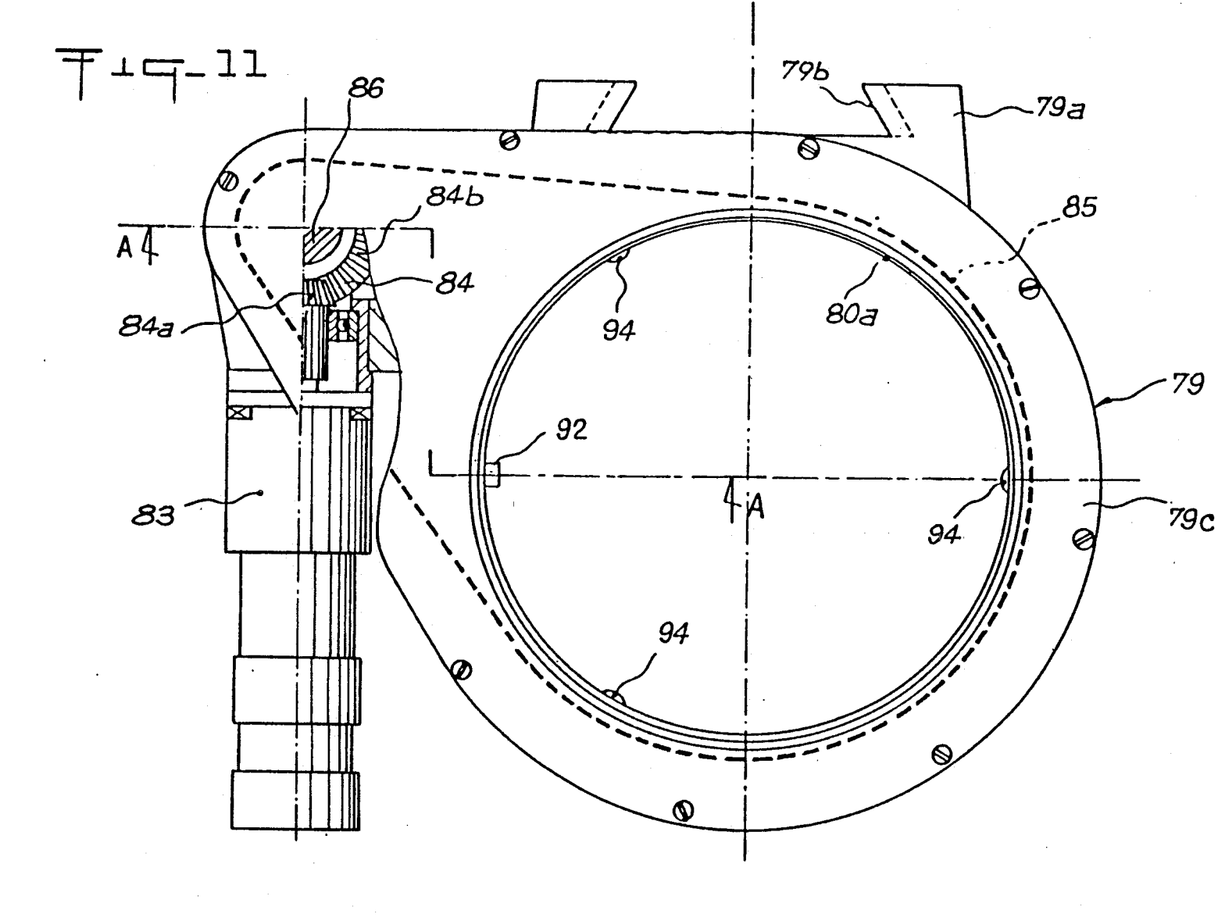
FIG. 11 is a plan view of the device shown in FIG. 10.

The module of the machine which constitutes the drive device 79 for rotating a tool can be seen in FIGS. 1, 10, and 11.

This device 79 is fixed to the orientable head plate 71 of the carriage 60 in the same way as a fixed tool, i.e. as described above. In order to fix the drive device in place, it includes a bearing member 79a which in turn includes a female dovetail 79b whose section increases going downwards in order to co-operate with the male dovetail 71c on the plate 71. The bearing plate 79a is connected to a frame 79b which constitutes a cowling containing a rotary ring 90 supported in a bearing system comprising two ball bearings 81 and 82 to rotate about an axis which is parallel to the elevator column 9.

The ring 80 is rotated by a motor and stepdown gear unit 83 via a bevel gear assembly 84 and a transmission 85 comprising pulleys and a cog belt. The motor unit and the axis of the driving gear 84a of said gear assembly lie in a plane perpendicular to the elevator column 9 and are situated on one side of the cowling 79c of the frame, and on an axis which is parallel to the longitudinal axis of the chassis 1.

The driven gear 84b of the gear assembly is fixed to an intermediate shaft 86 rotatably mounted in the frame 79c and extending parallel to the axis of rotation of the ring 80. The shaft 86 is thus mounted in a bearing assembly 79d including two sets of ball bearings 87 and 88. The drive pulley 79 is fixed to the top end of the shaft 86 and the cog belt 85 passes over the drive pulley to control rotation of the ring 80.

The bottom end of the intermediate shaft 86 includes an absolute encoder 90 which senses the number of rotations of the shaft 86, and taking account of the velocity ratio of the belt transmission 85, this gives the number of rotations of the ring 80, thereby enabling the position of the tool relative to the wall of the bolt hole to be determined at any instant, and thus enabling the tool to be positioned angularly.

The motor unit 83 is provided with a tachometer and a brake for locking the tool in position.

The ring 80 has a cylindrical central opening 80a passing through it from top to bottom and which is slightly flared in its top portion 90b. This cylindrical opening is provided to receive the tool, and only the tool head 91 can be seen in FIG. 10. A peg 92 extending orthogonally from the wall of the opening 80a ensures that the tool 91 is angularly positioned relative to the ring 80. The peg serves to prevent any relative rotation between the tool and the ring 80.

In order to achieve this result, the peg 92 co-operates with a groove 91a extending parallel to the generator lines of the tool head. The head is for the most part cylindrical and at its top end it has a flared portion 91b whose generator lines converge on the axis of the tool. The diameter of the tool head is slightly less than the diameter of the opening 80a so that the tool 91 is placed inside the ring with a minimum amount of clearance.

The ring 80 also includes a portion 80b extending beneath the frame 79c, which portion is threaded at its outside periphery in order to co-operate with inside tapping on a ring 93 whose outer periphery 93a is knurled in order to facilitate handling.

The top portion of the knurled ring 93 has a conical inlet 93b which flares outwardly with the same cone angle as the portion 91b of the head of the tool 91.

The height of the knurled ring 93 and the position of its conical inlet 93b are determined as a function of the positions of balls 94 for locking the tool in vertical translation relative to the drive ring 80.

The centers of the balls 92 lie in a plane perpendicular to the axis of revolution of the drive ring. The head of the tool 91 also includes a peripheral groove 91c at a distance $d_2$ from its top conical portion 91b. This groove has a circular right cross-section and serves to receive the balls 94 in the drive ring, thus ensuring that the balls are at the distance $d_2$ from the conical top end 80c of the ring 80.

There may be three balls 94, for example, disposed at 120° intervals level with the threaded portion 80b of the drive ring. They are received in cylindro-conical holes 80d made through the wall of the drive ring and opening out into the opening 80a so that spherical caps only of the balls can emerge into the opening for engaging in the groove 91c of the tool.

On the outside of the threaded portion 80b, the balls 94 come into contact with the flared conical portion 93b of the knurled locking ring 93.

The tool 91 is inserted into the drive ring 80 from above the cowling 79c, with the peg 92 engaging in the groove 91a of the tool, and the tool is lowered until its conical portion 91b engages in the conical inlet 80c of the drive ring.

In this position, the balls 94 are level with the peripheral groove 91c of the tool. The tool is then locked against vertical displacement by moving the ring 93 upwards. This is done by rotating the ring, e.g. to the right for a righthand thread. As the ring 93 is tightened, the balls 94 are cammed by the flared portion 93b into the central opening 80a of the drive ring, thereby engaging in the groove in the tool.

The tool is unlocked by rotating the ring 93 in the opposite direction. As it is loosened, the balls leave the groove 91c and return to being flush with the face of the opening 80a while still being contained in part within the cylindro-conical holes 80d.

When the knurled locking ring 93 is in its low position it comes into abutment against a rim 80e applied to the bottom end of the drive ring and the balls 94 emerge into the space 95 delimited by the threaded portion 90b of the drive ring and the flared wall 93b of the locking ring, and they are held captive, partially in said cylindro-conical housings 80d and partially in the annular space 95.

Naturally, the various portions described above by way of example could be modified or replaced without going beyond the scope of the invention by the person skilled in the art using equivalent portions performing the same functions.

We claim:

1. A tool carrier vehicle for transporting and positioning said tool over bolt holes in the flange of a vessel and for moving said tool in rotation and/or translation, such a vehicle comprising a chassis fitted with wheels for moving over the top face of the flange, motor means for rotating at least one of said wheels and causing the vehicle to move over the flange, and means for stopping the vehicle so that the tool can be presented successively on the axis of each of the bolt holes in the flange, wherein said vehicle further comprises:

a tool-carrying elevator column extending perpendicularly upwards from the chassis;

an elevator means of the elevator column for displacing the tool down through said chassis, inserting it in a bolt hole, and returning it to its initial high position after acting in a hole, said elevator means having a tool-receiving position;

said chassis having a tool-passing opening formed adjacent to said column and situated in alignment with said tool-receiving position of said elevator means; and guide means and position adjusting means for guiding and adjusting the position of the chassis on the flange in order to place the tool exactly on the axis of a bolt hole as a function of the diameter thereof.

2. A tool carrier vehicle for transporting and positioning said tool over bolt holes in the flange of a vessel and for moving said tool in rotation and/or translation, comprising;

a chassis fitted with wheels for moving over the top face of the flange, motor means for rotating at least one of said wheels and causing the vehicle to move over the flange, means for stopping the vehicle so that the tool can be presented successively on the axis of each of the bolt holes in the flange, a tool-carrying elevator column extending perpendicularly upwards from the chassis;

an elevator means of the elevator column for displacing the tool down through said chassis, inserting it in a bolt hole, and returning it to its initial high position after acting in a hole, said elevator means having a tool-receiving position; said chassis having a tool-passing opening formed adjacent to said column and situated in alignment with said tool-receiving position of said elevator means; and guide means and position adjusting means for guiding and adjusting the position of the chassis on the flange in order to place the tool exactly on the axis of a bolt hole as a function of the diameter thereof, said guide means having at least two reference wheels mounted to rotate about axes parallel to the elevator column and disposed in front of and behind said tool passing opening on one of the sides of the chassis, said reference wheels being situated beneath said chassis in a plane perpendicular to said column and bearing against one of the sides of said flange, at least two presser wheels situated on an opposite side of said chassis to the side on which said reference wheels are disposed, said presser wheels being situated in front of and behind said opening and beneath said chassis, and being mounted to rock about axes perpendicular to the axes of rotation of said reference wheels, said presser wheels being acted upon by means for moving them towards and away from the chassis, and being forced against the other side of the flange of the vessel when in a vehicle guiding position.

3. A vehicle according to claim 2, in which each of said reference wheels is eccentrically mounted on a support fixed to the bottom end of a mounting shaft including an operating member for pivoting the mounting shaft and thereby moving the reference wheel around an arc of a circle, thus positioning the reference wheel as a function of the width of the flange, said mounting shaft being threaded at its top end in order to cooperate with a tapped locking member for locking the reference wheel in position.

4. A vehicle according to claim 2, in which each of said presser wheels is fixed to a shaft received in a bearing in a rocking support, which support is connected to a crank-shaped operating lever pivotally mounted in a plane perpendicular to the rocking axis of said support via link means comprising: a slider co-operating with a slideway fixed to the chassis, said slider having its top end connected to its said crank-shaped lever by links and being extended at its opposite end by a piston received in a cylinder and engaging string means, said cylinder being connected by links to said rocking support.

5. A vehicle according to claim 4, and including a detection arm in said tool-passing opening, said arm being mounted to swing in a plane perpendicular to the axis of the elevator column and being situated at the bottom of the chassis to swing about an axis situated between an end-of-stroke abutment fixed to one of the ends of the arm and a point at which an armdriving member is coupled thereto for putting said arm either in an extended position inside the opening and in abutment against the chassis, or else in a retracted position adjacent to one of the sides of the chassis in order to leave room to pass the tool, the end of the arm opposite to its end having said abutment including at least two proximity detectors serving to detect the peripheral edge of a bolt hole in order to position the vehicle and the tool over the hole during vehicle displacement over the flange.

6. A vehicle according to claim 5, including a second arm in said tool-passing opening, said second arm being hinged to the chassis adjacent to its side opposite to the side to which the detection arm is hinged, said second arm swinging in a plane parallel to that of said detection arm to enable the second arm to be put either in an extended position where it extends into the opening or to retract said arm against the chassis in order to allow a tool to pass, the free end of said second arm including a gauge having at least two reference marks for matching with the peripheral edge of a bolt hole in order to enable the vehicle to be properly positioned transversely on the flange of the vessel for a tool to be positioned on the axis of the bolt hole.

7. A vehicle according to claim 6, in which the gauge lies in a diametral plane of the bolt hole when said second arm is in its extended position.

8. A vehicle according to claim 7, in which the elevator column is removable and is received in its own housing in the chassis adjacent to said tool-passing opening, the inside of said elevator column containing a threaded shaft extending along the height of the column and mounted between two sets of bearings, said shaft being connected to a motor and stepdown gear unit to be rotated thereby, and co-operating with a tapped portion of said elevator means displaceably mounted in a slot running along the height of one of the side walls of the column, said elevator means comprising a carriage which is guided by a slideway running parallel to said shaft and co-operating with ball skids, the bottom of said column including positioning studs which co-operate with stud-receiving housings in the chassis and with locking means for clamping it to the chassis.

9. A vehicle according to claim 8, in which said threaded shaft is connected to an absolute encoder which monitors the height of the carriage up the column, and thereby also monitors the extent to which a tool penetrates into a bolt hole.

10. A vehicle according to claim 9, in which the carriage of the elevator column includes a head plate which is orientable about an axis perpendicular to said column and extending above and to one side of the tool-passing opening in the chassis, said head plate including tool-fixing means, and said carriage also includes locking means for locking said head plate in position after its orientation has been adjusted.

11. A vehicle according to claim 10, in which said carriage and said head plate include respective cylindrical extensions terminated by respective symmetrical conically flared peripheral rims whose generator lines diverge to intersect in the join plane between said extensions, and in which the head plate is oriented and locked in position on the carriage by means of a collar comprising two hinged portions and having a V-groove for co-operating with said conical rims of the extensions on the carriage and on the head plate, said collar further including screw-operating clamping and unclamping means for unclamping the head plate in order to adjust its orientation, or for moving the two portions of the collar towards each other over said extensions in order to lock the head plate in position once its orientation has been adjusted.

12. A vehicle according to claim 11, in which the slot along which the carriage moves is masked by an endless tape providing protection against dust, with the ends of the tape being fixed to the carriage and with the tape winding over two rolls mounted to rotate freely at the top and at the bottom of the column, and in which the length of the tape which moves in the opposite direction to the carriage passes through the carriage and is subjected to the effect of tensioning rolls.

13. A vehicle according to claim 12, in which the tool is fixed and is displaced in translation in order to be inserted in a bolt hole and in order to be withdrawn therefrom after acting therein, and in which the head plate of the carriage and the tool include complementary male/female dovetail fixing means whose right cross-sections increase going downwards.

14. A vehicle according to claim 12, in which the tool is rotary and is displaced in translation in order to be inserted into a bolt hole and in order to be withdrawn therefrom after acting therein, in which said tool is mounted in a removeable rotary drive device connected to said head plate of the carriage, and in which the said head plate and the said drive device include complementary male/female dovetail fixing means whose sections increase going downwards.

15. A vehicle according to claim 14, in which said drive device comprises a frame including said dovetail fixing means, said frame being cantilevered over said tool-passing opening in the chassis and including a rotary tool-carrying drive ring whose axis of rotation is parallel to the elevator column.

16. A vehicle according to claim 15, in which said drive ring is mounted in a ball bearing assembly in the frame and is rotated by means of a transmission driven by a motor and stepdown gear unit fitted with a tachometer and with a brake.

17. A vehicle according to claim 16, in which the tool-carrying drive ring is rotated by a transmission comprising pulleys and a cog belt including a pulley fixed to an intermediate shaft which is rotated by said motor unit and which has an absolute encoder mounted thereon for determining the angular position of the drive ring and thus of the tool carried thereby.

18. A vehicle according to claim 17, in which said drive ring includes a central opening for receiving the tool and further includes a portion extending outside and beneath the frame, said portion having an external thread for co-operating with the internal tapping of a locking ring which actuates locking means for fixing the tool to the drive ring.

19. A vehicle according to claim 18, in which the opening in the drive ring is cylindrical for receiving a tool having a fixing head which is cylindrical and which includes a peripheral groove of circular right cross-section, said groove lying in a plane perpendicular to the axis of the tool, in which the drive ring includes cylindro-conical holes level with its threaded portion and opening out into said cylindrical opening, with the centers of the holes lying in the same plane perpendicular to the axis of revolution of the drive ring, each of said holes containing a ball, and in which said locking ring includes a flared inlet whose wall flares towards the outside of the locking ring, which flared wall comes into contact with said balls so that by rotating said locking ring the balls are urged towards the inside of the cylindrical opening of the drive ring by said flared wall, thereby penetrating into the groove of the tool so as to lock the tool in vertical translation relative to the drive ring, and whereby rotating the locking ring in the opposite direction allows the balls to be retracted thus allowing the tool to be withdrawn from the drive ring.

20. A vehicle according to claim 19, in which the drive ring includes a peg substantially halfway up the drive ring for positioning a tool in the ring and for preventing any relative rotation between the tool and the ring, said peg co-operating with a groove in the tool running parallel to the generator lines of the head of the tool.

21. A vehicle according to claim 20, in which the drive ring includes a flared inlet at its top end, and in which the top end of each tool includes a flared portion for exactly engaging said flared inlet to the drive ring, thereby positioning the tool therein and ensuring that the peripheral groove in the tool comes vertically level with the locking balls.

* * * * *